Jan. 9, 1945.  F. J. HANSGIRG  2,367,020
TREATMENT OF METALLIC MATERIAL
Filed May 29, 1944  2 Sheets-Sheet 2
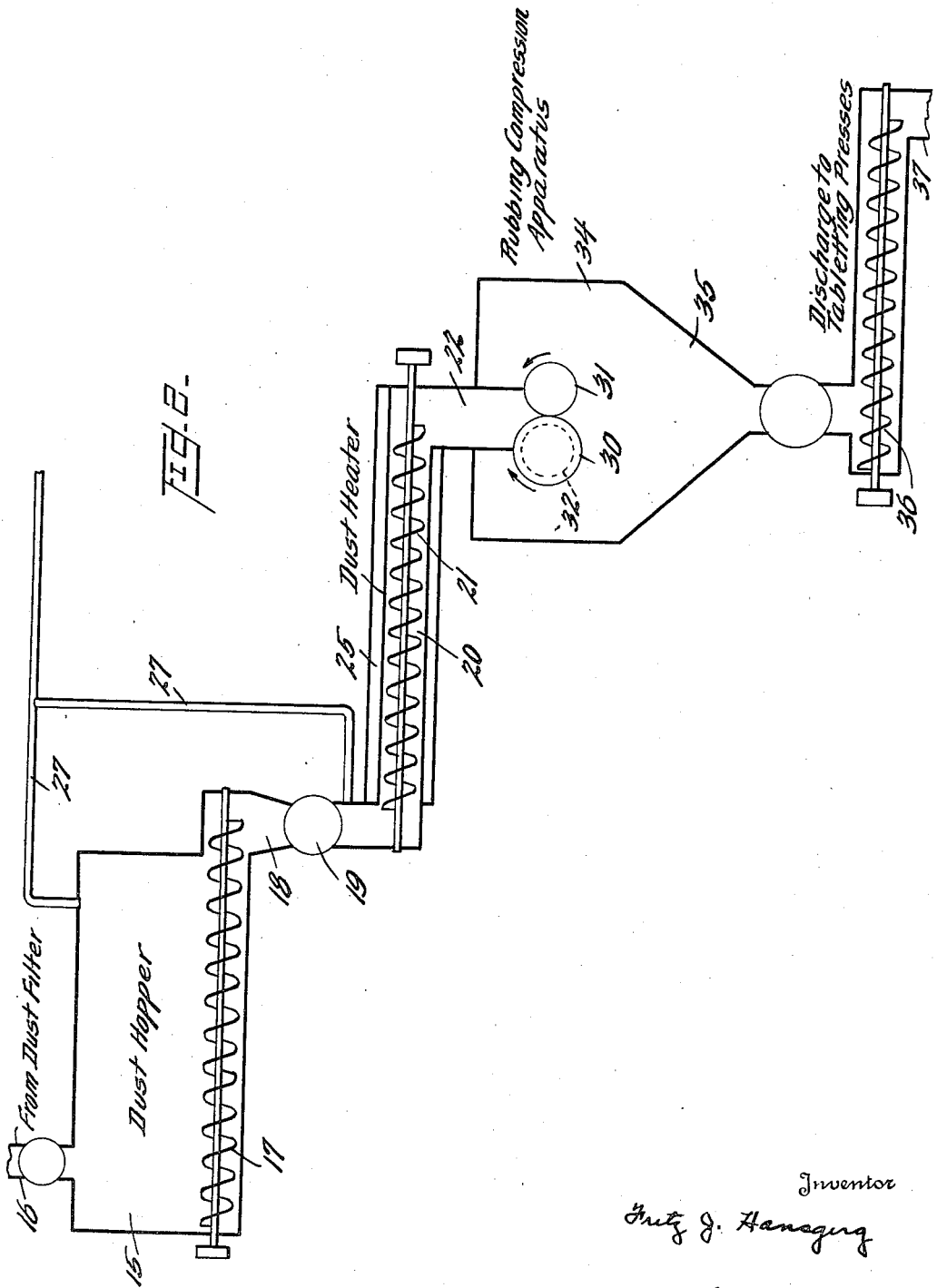

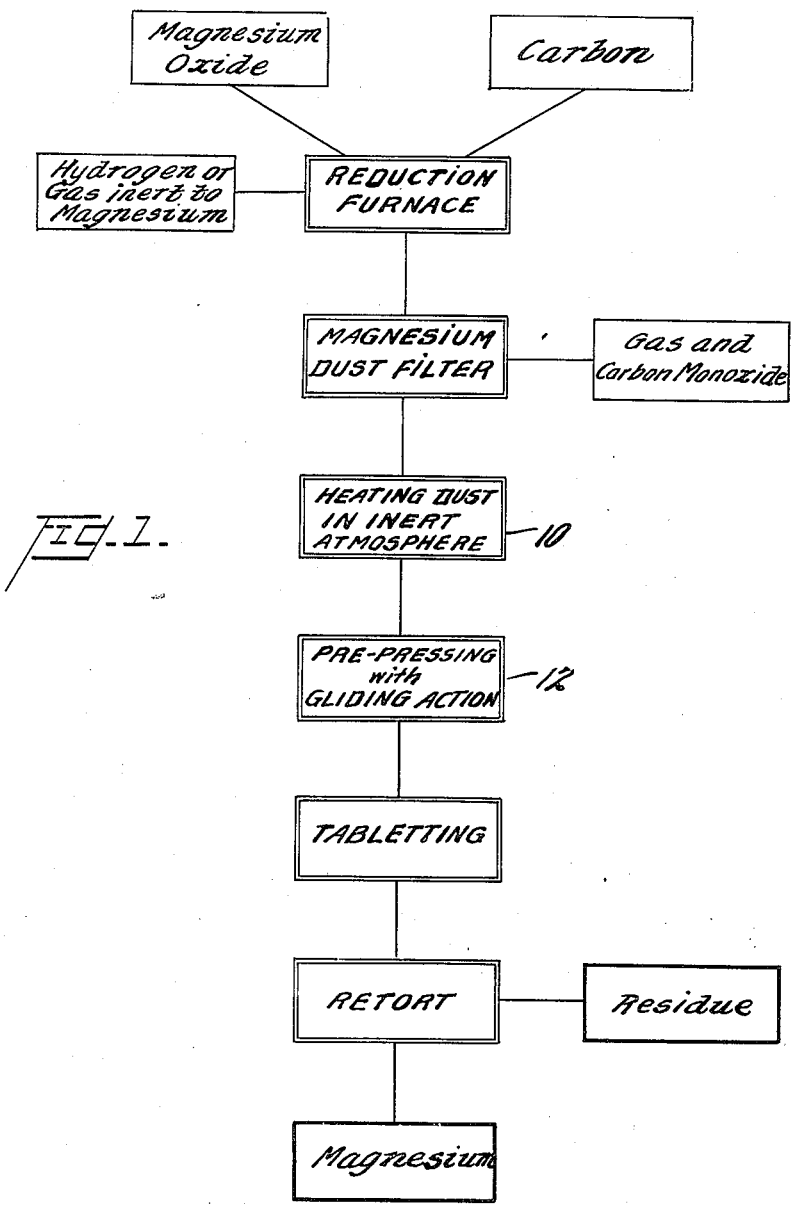

Patented Jan. 9, 1945

2,367,020

UNITED STATES PATENT OFFICE 2,367,020

TREATMENT OF METALLIC MATERIALS

Fritz J. Hansgirg, Black Mountain, N. C., assignor to North Carolina Magnesium Development Corporation, Asheville, N. C., a corporation of North Carolina Application May 29, 1944, Serial No. 537,973

5 Claims. (Cl. 75—22)

This invention relates to the production of magnesium or similar metals and more particularly to certain processes involved in such production which precede the distillation or sublimation steps by which the metal is recovered in substantially pure form.

The general object of the invention is to provide a novel and improved process for the production or treatment of magnesium or the like by which the dust from the reduction steps is more advantageously prepared for the subsequent recovery of the pure metal.

The practice of the novel process will be better understood if the accompanying drawings are examined during the perusal of the following specification. It is understood, however, that although specific language is employed in the specification and the drawings show particular apparatus and a flow sheet relating to the production of magnesium, such disclosures are but exemplary in nature and no limitation of the scope of the invention is to be read therefrom, except as determined by the subjoined claims. All patentable equivalents—whether of materials, methods, or apparatus—are deemed to be comprised within the purview of the invention.

In the drawings—

Figure 1 is a flow sheet illustrating the application of my novel process to the general carbothermal method of production of magnesium; and Figure 2 is a quite diagrammatic view of an installation capable of being used in pursuing the novel process.

In the carbo-thermal reduction process for the production of magnesium, the metal is first produced in the form of a very fine dust, which contains not only metallic magnesium but also the impurities previously contained in the raw material, as well as some carbon, magnesium oxide, calcium carbide, aluminum carbide, and ferrosilicon in various amounts corresponding to the analysis of the magnesite used for the reduction process.

The usual method pursued in recovering from this magnesium dust the metal in compact form is either a distillation or sublimation process consisting in evaporating the metal from the dust and leaving behind the above mentioned accompanying substances as a residue.

The metal vapors which are evolved from this dust either in vacuum or at atmospheric pressure have the faculty of carrying along dusty impurities into the condensation chamber thus contaminating the metal again. It is also difficult to supply to a loose dust the necessary heat to evaporate the metal. For these reasons it has already been proposed to compact the dust to shaped bodies before it undergoes distillation or sublimation. For example, it has been proposed to mix the dust with baking hydro-carbon oils, evaporate the hydro-carbon oils and bake the dust together by means of a coke skeleton formed by cracking the hydro-carbon oils. It has also been suggested to compress the dust to form tablets or pellets either with or without employing a binder substance. The use of any binder substance as well as hydrocarbon oils has the disadvantage that it is not possible in a baking process to drive out the binder substance entirely and later during the distillation or sublimation process some residual amounts of the binder are driven out with the metal vapors and again contaminate the metal in the condensation zone. Therefore, the dry tablet process without using a binder is the most useful method to form the magnesium dust into shaped bodies hard enough to withstand the evaporation of the metal, the residue remaining still shaped without collapsing and forming a powder again.

The magnesium dust can be produced in the primary reduction process either by chilling with hydrogen or by chilling with natural gas which consists mainly of methane. The latter gas is eight times heavier than hydrogen and thereofore the diffusion properties of hydrogen and methane are in the ratio of the square roots of the molecular weights, that is, in the ratio of $\sqrt{2}$ to $\sqrt{16}$, which means 1.41 to 4. Therefore, the dust produced by natural gas chilling retains the absorbed gas much more strongly than the dust chilled with hydrogen.

If the dust undergoes a tableting process by the application of pressure, the included gas has to be driven out, since in the case of compression of a loose dust the occluded gas acts as an elastic pillow and prevents the dust particles from being pressed together so that no tablet will be formed if much gas is retained in the dust. In case of hydrogen with its extremely small viscosity, it can be driven out during the pressing, but methane with its much greater viscosity is retained to so great an extent that a simple pressing does not drive out the gas easily.

For these reasons a pre-treatment is used to degas the dust before dry tableting and the most common method employed is to pre-press the dust between cylinders to produce loose flakes which are then charged to a pelleting machine of a known type. But in all these cases difficulties in effecting the pelleting still remain since from the shock cooling process the metallic magnesium particles are coated with graphitic carbon which does not easily pellet. It is well known that neither charcoal nor graphite powder can be pelleted without a binder. The pelleting properties of the magnesium dust depend mainly on the metal and on the magnesium oxide both of which substances are able to be compacted to solid bodies by pressure without the use of a binder.

The present invention contemplates the provision of a method of pre-treating the magnesium dust in such a way that the dust becomes more suitable for dry pelleting. This method comprises heating the magnesium dust before pelleting to such a temperature that the magnesium metal becomes plastic. It is known that pure magnesium crystals can be extruded in the form of a solid bar if heated to a temperature where plasticity is reached, approximately 300° C. to 360° C.

According to the process the magnesium dust is therefore heated to a temperature between 300° C. and 360° C. (see panel 10 of Fig. 1). By such a heating process the absorbed gas is to a great extent driven out and after the dust has reached such a temperture it is subjected to a gliding compression to remove the coating surface from the plastic magnesium particles and expose free metal surfaces for compression contact (see panel 12 of Fig. 1). Such gliding pre-compression can be easily performed between steel cylinders or rollers having somewhat different peripheral speeds. One way of effecting this is to employ two rollers rotating with the same angular velocity but having a slightly different diameter. By exposing the dust heated at such a temperature to such gliding pre-compression, flakes are formed which when charged at such temperature to a known pelleting equipment are formed into extremely hard solid pellets, which undergo the distillation or sublimation process without giving rise to any flying dust and yielding a metal of high purity in the condensation zone.

There is illustrated very diagrammatically in Fig. 2 of the drawings an installation suitable for carrying out the process in connection with the production of magnesium. A hopper 15 is provided to receive the magnesium dust from the dust filter through the valved conduit 16. A screw conveyor 17 moves the material to the hopper discharge 18 which may be controlled by a valve 19. A dust heater 20 is provided to receive the dust from the valved hopper 18. A screw conveyor 21 moves the dust through the heater to the discharge point 22. Surrounding the heater is a heating device 25 which may be of any suitable type capable of raising the temperature to the necessary range for rendering the metal or material plastic. The heater may be composed of electrical resistors or may be of any other suitable type.

Piping for taking off the gases driven out of the material is indicated at 27, connections being made with the dust hopper and with the inlet end of the heater.

When the coated metallic dust passes from the heater outlet 22 it is guided between the rollers 30 and 31, the roller 30 being of somewhat larger diameter than the roller 31 but both rotating at the same angular velocity. This may be accomplished, of course, by providing pinions of equal size for driving the rollers, the pinion for the roller 30 being indicated at 32.

The rollers are preferably housed within a casing indicated at 34 and the material after being subjected to the rubbing or gliding compression by the rollers falls into the hopper 35 from whence it passes into the conveyor 36 and then outwardly at 37 to a tableting press or other destination.

Having thus described the invention what is claimed as new and desired to be secured by Letters Patent is:

1. The method of dry pelleting magnesium dust, the particles of which are coated with carbonaceous or other non-coalescing material, which comprises heating the dust to a temperature at which the material of the particles becomes plastic, and subjecting the plastic material to a gliding pre-compression.

2. The method of dry pelleting magnesium dust, the particles of which are coated with carbonaceous or other non-coalescing material, which comprises heating the dust to a temperature at which the material of the particles becomes plastic, subjecting the plastic material to a gliding pre-compression by passing the dust between rollers rotating at different peripheral linear velocities.

3. The process for the pre-treatment of magnesium dust produced by carbo-thermal reduction for the purpose of effecting the dry pelleting of said dust, which comprises heating the dust to a temperature between about 300° C. to 360° C., subjecting the dust to a gliding pre-compression, whereby there are exposed on the then plastic magnesium particles metallic surfaces capable of flowing together upon the application of pelleting pressure, so that the particles will coalesce to form hard solid bodies.

4. The process for the pre-treatment of magnesium dust produced by carbo-thermal reduction for the purpose of effecting the dry pelleting of said dust, which comprises heating the dust to a temperature between about 300° C. to 360° C., subjecting the dust to a gliding pre-compression by passing the heated dust between rollers rotating at somewhat different peripheral linear velocities, whereby there are exposed on the then plastic magnesium particles metallic surfaces capable of flowing together upon the application of pelleting pressure, so that the particles will coalesce to form hard solid bodies.

5. The process for the pre-treatment of magnesium dust produced by carbo-thermal reduction for the purpose of effecting the dry pelleting of said dust, which comprises heating the dust to a temperature between about 300° C. to 360° C., subjecting the dust to a gliding pre-compression by passing the heated dust between steel rollers moving against each other and rotating at the same angular velocity but being of slightly different diameter, whereby there are exposed on the then plastic magnesium particles metallic surfaces capable of flowing together upon the application of pelleting pressure, so that the particles will coalesce to form hard solid surfaces.

FRITZ J. HANSGIRG.